United States Patent [19]

Starace

[11] 3,930,871

[45] Jan. 6, 1976

[54] THICKENING COMPOSITIONS

[75] Inventor: Charles A. Starace, Brooklyn, N.Y.

[73] Assignee: Kelco Company, San Diego, Calif.

[22] Filed: Mar. 10, 1971

[21] Appl. No.: 123,082

[52] U.S. Cl. .................. 106/35; 106/205; 106/210; 260/209 R; 260/233.3 R
[51] Int. Cl.² ...... C09J 3/06; C09J 3/26; C09K 3/00
[58] Field of Search ............. 106/35, 205, 208–210, 106/214, 213; 127/32, 33; 260/209, 233.3; 424/50; 32/1; 195/31

[56] References Cited
UNITED STATES PATENTS

| | | | |
|---|---|---|---|
| 3,000,790 | 9/1961 | Jeanes et al. | 106/205 X |
| 3,232,929 | 2/1966 | McNeely et al. | 260/209 |
| 3,551,133 | 12/1970 | Sprayberry et al. | 424/34 X |

FOREIGN PATENTS OR APPLICATIONS 1,202,629  8/1970  United Kingdom.................. 106/35

Primary Examiner—Joan E. Welcome

[57] ABSTRACT

A thickening composition comprising a mixture of a Xanthomonas hydrophilic colloid with dextrin. A thickened aqueous media containing a mixture of a Xanthomonas hydrophilic colloid and dextrin. A denture adhesive composition containing a Xanthomonas hydrophilic colloid, dextrin and a buffering salt in an amount which is effective to provide a pH for the denture adhesive composition which is neutral or slightly higher.

9 Claims, No Drawings

THICKENING COMPOSITIONS

This invention pertains to novel thickening compositions. More specifically, the invention pertains to a mixture of dextrin with a Xanthomonas hydrophilic colloid and to the use of such compositions in forming denture adhesive compositions and thickened aqueous media.

Xanthomonas hydrophilic colloids are known materials which have been widely used as thickening agents in aqueous media. Moreover, dextrins are known materials that are prepared from starch (principally corn starch) and they have been used in various applications as thickeners. One of the principal characteristics of Xanthomonas hydrophilic colloids are their stability and the fact that they are generally unreactive. Thus, they are compatible with acids and bases and are suitable for a wide variety of use applications.

I have found that there is a surprising interaction between a Xanthomonas hydrophilic colloid and dextrin in an aqueous medium to produce viscosities in excess of those which would be predicted from the additive effects of the individual components. Moreover, I have found that the use of mixtures of a Xanthomonas hydrophilic colloid with dextrin, provides a very tacky material when contacted with water to produce a denture adhesive.

Xanthomonas hydrophilic colloids are known materials and have been described in the literature. As an example, such a colloid as prepared by the bacterium Xanthomonas campestris. The colloid is a polymer containing mannose, glucose, potassium glucuronate and acetyl radicals. In such a colloid, the potassium portion can be replaced by several other cations without substantial change in the properties of the colloid for the purposes of the present invention. The colloid, which is a high molecular weight, exocellular material, may be prepared by the bacterium *Xanthomonas campestris*, by whole culture fermentation under aerobic conditions of a medium containing commercial glucose, an organic nitrogen source, dipotassium hydrogen phosphate and appropriate trace elements.

It is expedient to grow the culture in intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured under vigorous agitation and aeration at a temperature of about 30°C. The culture so produced may then be used to inoculate a higher glucose (3%) content broth of larger volume in a second intermediate stage where the bacteria are again cultured with aeration and agitation.

The culture so acclimated for use with glucose by the aforementioned intermediate stages may then be added to the final glucose medium and reaction in the final stage may be satisfactorily carried out at about 30°C. with vigorous agitation and aeration. The resulting Xanthomonas campestris colloid can be recovered by precipitation in methanol of the mixture from the fermentation.

Other Xanthomonas colloids may be prepared by repeating the procedure used for producing a *Xanthomonas campestris* colloid as described above, by substituting known *Xanthomonas* bacteria, i.e., *Xanthomonas carotae, Xanthomonas incanae, Xanthomonas begoniae*, and *Xanthomonas malvacearum*, for the bacterium, *Xanthomonas campestris*.

In an alternative method for recovering the colloidal material, it is not recovered by precipitation as, for example, in methanol. Rather, the mixture resulting from the final fermentation step of the process is dried by the application of heat. To illustrate, the hydrophilic colloidal material can be separated by passing the mixture from the fermentation to a drum dryer which is heated with steam at 40 psi. The dried film on the drum surface is thereafter removed with a sharp knife or doctor blade.

A number of alternative drying methods may be employed in separating the hydrophilic colloidal material which is employed in my invention. Thus, for example, the hydrophilic colloidal material may be separated by subjecting the mixture from the fermentation to spray drying, etc.

A still further alternative means of preparing a Xanthomonas hydrophilic colloid, as described above, is to heat treat the final fermentation beer for about ten minutes at a temperature ranging from about 140° to 160°F. at a pH of about 10 or above. If desired, the beer may be heat treated at an even higher temperature, such as about 180°F., while the time of treatment is reduced to a shorter time, such as about one minute. Following the heat treatment, the beer may be neutralized with an acid, such as hydrochloric acid or sulfuric acid to a pH of about 6.1, such that the colloid after drying has a pH of about 6.5 to 8.0.

A preferred Xanthomonas hydrophilic colloid for use in my compositions is that prepared by the bacterium Xanthomonas campestris. This particular colloid is available commercially in a food grade which is admirably suited for use in denture adhesive compositions.

My compositions may contain varying quantities of a Xanthomonas hydrophilic colloid and dextrin. I have found that mixtures containing various weight ratios of dextrin to Xanthomonas hydrophilic colloid produce unexpectedly high viscosities in an aqueous medium. For example, I have determined that weight ratios of dextrin to Xanthomonas hydrophilic colloid ranging from 1:1 to 15:1 or higher produce satisfactory thickeners.

To further demonstrate the use of my compositions in providing increased viscosities in aqueous media, there are presented the following examples in which all parts and percentages are by weight unless otherwise indicated:

EXAMPLE I

Various solutions were prepared by adding Xanthomonas campestris hydrophilic colloid (KELTROL F, produced by the Kelco Company), dextrin, or blends of a Xanthomonas hydrophilic colloid with dextrin to water. Following the addition of the thickener to tap water, it was stirred for a period of one minute in a Waring Blender and the viscosity of the solution was then measured with a Brookfield Model LVF Viscometer at a speed of 60 R.P.M. at room temperature (about 25°C). These tests are described in the following table in which the quantities of dextrin and Xanthomonas campestris hydrophilic colloid are indicated in grams while the quantitiy of water is indicated in milliliters. The viscosities of the resulting solutions are shown in centipoises together with the spindle used in the measurement:

TABLE I

| XANTHOMONAS CAMPESTRIS COLLOID | DEXTRIN | WATER | VISCOSITY (cps) | SPINDLE |
|---|---|---|---|---|
| 0 | 1 | 100 | 3 | 1 |
| 0 | 5 | 100 | (10) | 2 |
| 0 | 10 | 100 | 12 | 2 |
| 0 | 15 | 100 | 18 | 2 |
| 1 | 0 | 100 | (1285) | 3 |
| 1 | 1 | 100 | (1365) | 3 |
| 1 | 5 | 100 | (1585) | 3 |
| 1 | 10 | 100 | (2035) | 4 |
| 1 | 15 | 100 | (2363) | 4 |

The dextrin employed in the above tests was American Maize No. 1079 as obtained from American Maize Products Company. The bracketed viscosities shown in the table are average viscosity readings based on repeated experiments. The data demonstrates that dextrin, by itself, is a very poor thickener. At dextrin concentration levels ranging from 1 to 15 parts by weight, very low viscosities in aqueous media were observed. The Xanthomonoas hydrophilic colloid is a highly efficient thickener and at concentration levels of 1 part by weight produced an average viscosity of 1285 centipoises.

Surprisingly, mixtures of a Xanthomonas hydrophilic colloid and dextrin produces viscosities which were significantly higher than the viscosity obtained from the use of a Xanthomonas hydrophilic colloid alone. Inasmuch as dextrin produced very little thickening in aqueous media, it was unexpected that its use with a Xanthomonas hydrophilic colloid would produce a substantial increase in viscosity.

As stated previously, the use of dextrin in admixture with a Xanthomonas hydrophilic colloid was found to produce compositions which are quite suitable for use as a denture adhesive. At the present time, most denture adhesives contain gum karaya as the principal ingredient. Gum karaya is the name given to the dried exudation of the Sterculia urens tree grown in India. In the past, problems have been encountered in obtaining gum karaya of uniform quality and the supply of gum karaya has varied from one time to another — thus making gum karaya an undependable product.

Due to the various drawbacks in the use of gum karaya, it has long been desired to obtain a suitable denture adhesive composition which did not require its use. By way of background, denture adhesive compositions are widely used to provide adhesion between the denture plates and supporting mouth surfaces of the wearer. The presence of a denture adhesive keeps the dentures in place within the wearer's mouth so that they do not move about during usage.

I have found that denture adhesive compositions having admirable adhesive properties are obtained by blending dextrin with a Xanthomonas hydrophilic colloid. Suitable compositions may contain from about 60 to about 90 parts by weight of dextrin and from about 10 to about 40 parts by weight of a Xanthomonas hydrophilic colloid. Preferably, the Xanthomonas hydrophilic colloid employed is a Xanthomonas campestris colloid. The denture adhesive composition may also contain a buffering salt in an amount which is suitable to provide a pH of about neutral, e.g., about 6 to about 8. Suitable buffering salts are magnesium oxide and sodium tetraborate. In general, the buffering salt may be present in an amount up to about 10 parts by weight of the denture adhesive composition.

In determining the adhesive properties of my compositions, a test was devised which approximated the stresses imposed on a denture adhesive during use. In this test, a wooden tongue depressor having a length of 6 inches and a width of ¾ inches was supported in a substantially horizontal position. Following this, a denture adhesive composition of my invention was mixed with an equal weight of water and blended, using a mortar and pestle. After blending of the mixture, ¼ teaspoon of the blended mixture was placed on the supported tongue depressor about ½ inch from its end. A second tongue depressor having the same dimensions as the first was then pressed over the freshly prepared adhesive. The second depressor was positioned at right angles to the first during pressing and the second tongue depressor contacted the adhesive at a point approximately ½ inch from the end of the second depressor. A 20gm weight was then placed on the upper surface of the second tongue depressor at a distance ¾ inch from its other end, which provided a distance between the center of the 20gm weight and the point of the adhesion of the second tongue depressor of approximately 4¾ inches.

After a period of time, the force exerted by the 20gm weight caused the second depressor to pull away from the first which caused the weight to slide off the surface of the second depressor. This time period was measured in seconds and its value was proportional to the adhesiveness of the composition.

A composition of my invention containing 20% by weight of Xanthomonas campestris hydrophilic colloid (KELTROL F from the Kelco Company), 70% by weight of American Maize No. 1079 dextrin, and 10% by weight of sodium tetroborate was tested in the above manner. Ten grams of the composition was weighed into a mortar and to this was added 10gm of distilled water with stirring. After blending the mixture with a pestle for about 3 minutes, ¼ teaspoon of the mixture was placed on a first tongue depressor and its adhesion to a second tongue depressor was determined as described above. The composition provided satisfactory adhesion between the two tongue depressors and 15 second were required before the 20gm weight slid from the surface of the second tongue depressor. This result compared very favorably with that obtained by using the same test procedure with a commercially available denture adhesive containing gum karaya.

EXAMPLE II

In further tests, a variety of denture adhesive compositions were prepared which contained varying quantities of Xanthomonas hydrophilic colloid and dextrin. These compositions are set forth in the following table:

TABLE II

| | Test Formulations No. 1 | No. 2 | No. 3 | No. 4 |
|---|---|---|---|---|
| Dextrin (Crystal gum) | 69.8 | 69.8 | 80 | 75 |
| Xanthomonas hydrophilic colloid | 30 | 20 | 9.8 | 15 |
| Sodium Borate (100 mesh) | — | 10 | 10 | 9.8 |
| Flavor (Peppermint) | 0.2 | 0.2 | 0.2 | 0.2 |

The quantities of the various ingredients set forth in the above table are shown in parts by weight. The particular dextrin employed in these compositions is Crystal Gum dextrin obtained from National Starch Company. The Xanthomonas hydrophilic colloid utilized was KETROL F from the Kelco Company. All of the above compositions were found to have the adhesive properties required of a suitable denture adhesive. This was determined by mixing the various compositions with an equal weight of distilled water and observing the adhesive properties of the resulting mixture. Each of the compositions had a long, stringy, chewing-gum-like character that is characteristic of the adhesive properties required by a denture adhesive.

As demonstrated by the foregoing data, I have provided denture adhesives having very desirable properties. The adhesive properties of my denture adhesives can be varied by controlling the relative qualities of the Xanthomonas hydrophilic colloid and dextrin. Similarly, the moisture absorption properties of the denture adhesive may be controlled by varying the amount of dextrin in the composition. This provides a degree of control of the moisture absorption and the adhesiveness which is not provided by presently available denture adhesives which contain gum karaya.

In using my denture adhesives in a dry form, as described above, they can be simply dusted onto the denture which is then placed in the mouth. Preferably, the surface of the denture plate is wetted prior to application of the denture adhesive composition thereto.

If desired, my denture adhesive compositions may be made up in the form of a paste by admixing the dry composition with a suitable amount, such as about 40 to about 60% by weight, of water. Also, if desired, my denture adhesives may be made up in the form of a cream. This may be accomplished, for example, by blending from about 40 to about 60 percent by weight of my dry denture adhesive composition, as defined above, with about 60 to about 40 percent by weight of a nontoxic cream base material such as petrolatum. Also, other optional ingredients such as a wetting agent, eg., sodium dioctyl sulfosuccinate, or a preservative such as propyl paraben may be present in minor amounts. It is known to formulate denture adhesives in the form of a cream and the particular manner of doing this is not a part of my invention.

I claim:

1. A denture adhesive composition consisting essentially of about 10 to about 40 parts by weight of a Xanthomonas hydrophilic colloid and from about 60 to about 90 parts by weight of dextrin, said colloid-dextrin mixture providing the adhesive property.

2. The composition of claim 1 containing a buffering salt in minor amount suitable to provide a pH of about neutral.

3. The composition of claim 2 wherein said buffering salt is sodium tetraborate.

4. The composition of claim 1 in the form of a dry powder.

5. The composition of claim 1 in the form of a paste containing from about 40 to about 60% by weight of water.

6. The compostion of claim 1 in the form of a cream base formulation.

7. The composition of claim 1 wherein said colloid is a Xanthomonas campestris colloid.

8. The composition of claim 6 containing a buffering salt in minor amount suitable to provide a pH of about neutral.

9. The composition of claim 8 wherein said buffering salt is sodium tetraborate.

* * * * *